Aug. 14, 1956  W. C. HEATH  2,758,851
PACKED BALL AND SOCKET PIPE JOINT
Filed April 11, 1951  2 Sheets-Sheet 1

INVENTOR
WILLIAM C. HEATH
BY Strauch, Nolan & Diggins
ATTORNEYS

Aug. 14, 1956 W. C. HEATH 2,758,851
PACKED BALL AND SOCKET PIPE JOINT
Filed April 11, 1951 2 Sheets-Sheet 2
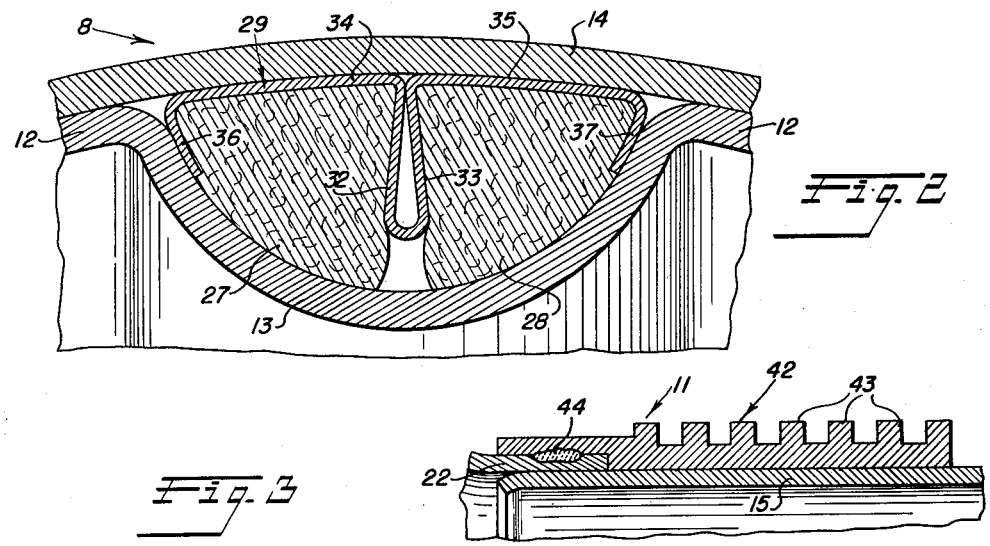
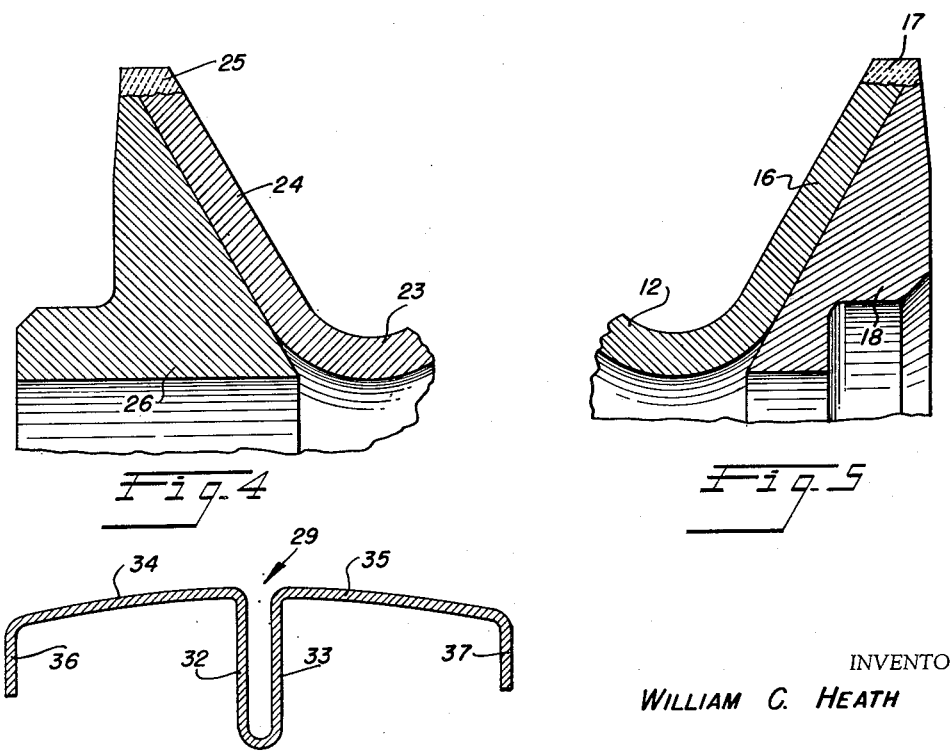
INVENTOR
WILLIAM C. HEATH
BY Strauch, Nolan & Diggins
ATTORNEYS

United States Patent Office 2,758,851
Patented Aug. 14, 1956

2,758,851

PACKED BALL AND SOCKET PIPE JOINT

William C. Heath, La Mesa, Calif., assignor to Solar Aircraft Company, San Diego, Calif., a corporation of California Application April 11, 1951, Serial No. 220,383

8 Claims. (Cl. 285—261)

This invention relates to packed ball and socket pipe joint and more particularly to such joints especially suited for use in pressurized aircraft exhaust systems which are subjected to relatively high temperatures and differential pressures for extended periods of continuous use.

The Patent No. 2,381,426 issued August 7, 1945, to Allen and Heath discloses a flexible exhaust line joint which is relatively satisfactory for open end exhaust systems wherein the pressure within the conduit or exhaust pipe is only slightly above the ambient pressure. However, in closed systems, such as are located between the engine and supercharger, or in a jet engine in positions substantially forward of the exhaust jet, as between the compressor and turbine, there may be more than 12 pounds per square inch differential between internal and external pressures, particularly as the external pressure drops off with increase in altitude.

Under such differentials, considerable leakage occurs, and even as this is brought down to less than 8 pounds per minute at time of installation in accordance with some specifications, this leakage through the fibrous packing provided for sealing the joint disclosed in Patent 2,381,426 is sufficient to raise the packing filaments to substantially gas temperatures, at which temperature the packing tends to abrade rapidly. Small pieces of the packing are carried between the ball surfaces of the joint, which cause pitting and premature wear. This leakage and the resultant deterioration of the packing and joint occurs despite the fact that these packings were developed specifically for high temperature service and when suitable materials could be found.

One of the principal features of the instant invention is the provision of an abrasion strip or retainer partially surrounding the fibrous packing to eliminate the abrasive effect thereon. The abrasion strip is also so formed as to have a central imperforate wall and two outer walls extending a substantial distance radially into the fibrous packing to impede any flow of gas through the packing.

It is believed that the fibrous packing serves primarily as a resilient backup member forcing the abrasion strip against the wall of the joint and the abrasion strip thus functions as the primary flow impeding member rather than the fibrous packing.

In the aforesaid Patent 2,381,426 the relatively rotatable ball joints are connected by a packed axial slip joint. Another feature of the instant invention is a gas tight slip joint employing no packing but providing relative axial movement at operating temperatures as well as at ambient temperatures. This is advantageously accomplished in the illustrated embodiment by employing a modification of the expansion joint shown in Patent 2,458,635 issued January 11, 1949, to Pitt and Sprenger.

It is accordingly the principal object of the invention to provide a new and improved flexible and expansible joint for conduits carrying pressurized gases at high operating temperatures.

Another important object is the provision of a new and improved flexible joint employing a fibrous packing or gasket between relatively movable joint parts, and wherein the fibrous packing is partially surrounded by a retainer to reduce the abrasive action of the joint parts upon the packing whereby the packing has an extended useful life.

Another important object is the provision of an improved joint employing fibrous packing wherein the packing includes imperforate barrier walls impeding the flow of gases through the joint.

It is still another object of the invention to provide a novel sliding joint that is gas tight at operating temperatures.

Other objects will become apparent as the description proceeds in connection with the accompanying drawings, wherein:

Figure 2 is an enlarged sectional view of one of the ball and socket gasket sealed joints;

Figure 3 is an enlarged sectional view of the axial slip joint;

Figures 4 and 5 are enlarged sectional views of the ends of the joint; and

Figure 6 is a section through the retainer strip before it is compressed into one of the ball and socket joints.

Figure 1:
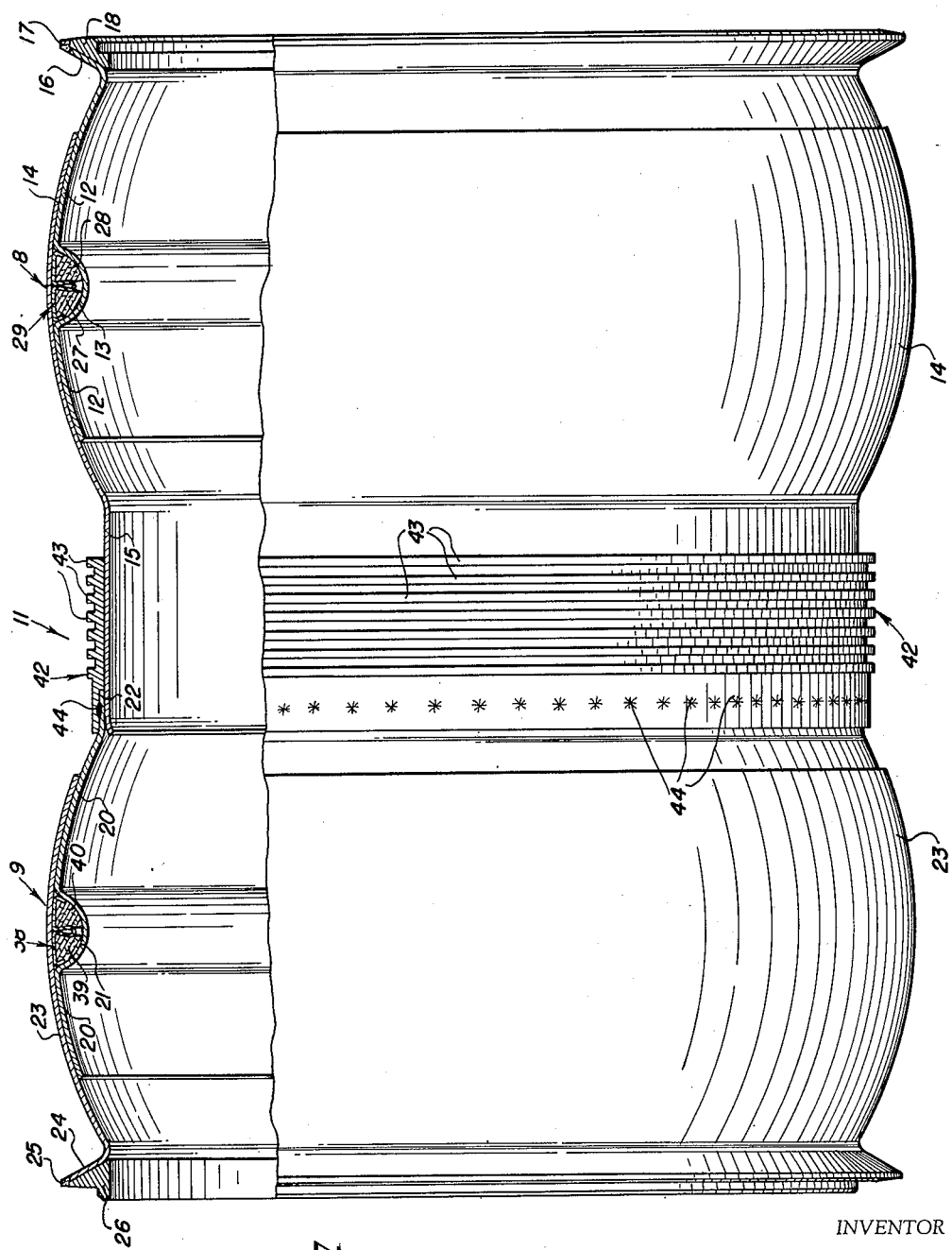
Figure 1 is a side elevation, partly in section of an illustrative embodiment of the invention.

The joint of Figure 1 provides limited freedom of relative movement in all directions between two conduit sections (not shown) which are connected to the reinforced ends shown in Figures 4 and 5. Relative angular movement is provided by the pair of ball and socket joints indicated generally at 8 and 9. Axial movement is provided by the slip joint indicated generally at 11 and shown in enlarged detail in Figure 3.

Referring particularly to Figures 1 and 2, the ball and socket joint 8 comprises a tubular internal ball member 12 of stainless steel metal having a peripheral depression or equatorial groove 13 rolled therein. The member 12 is received with a sliding or rotating fit within a mating tubular external socket member 14 that terminates in a cylindrical section 15 which is preferably chromium plated. At its right end the ball member 12 is flanged outwardly (see Figure 5) at 16 where it is welded as at 17 to a stepped ring 18 that forms a part of a quick disconnect attachment to one of the conduit sections (not shown) that are connected by the subject joint. Preferably the external surface of at least the ball member 12 including the groove 13, is hard chromium plated, but the inner surface of socket member 14 may also be similarly plated.

The left hand ball and socket joint 9 is similar to joint 8, but here the internal ball member 20 with its peripheral or equatorial groove 21 terminates at its right end in a cylindrical section 22 that has a slip fit over the left end of the mating cylindrical section 15 on the socket member 14 of joint 8. The internal ball member 20 of joint 9 is received with a sliding or rotating fit within the mating tubular external socket member 23 that terminates at its left end in an outwardly extending flange 24 (see also Figure 4) welded as at 25 to a stepped ring 26 that forms a part of another quick disconnect attachment to the other of the conduit sections (not shown) that are connected by the subject joint.

Within the equatorial groove 13 of joint 8 is received an annular packing of fibrous metallic filaments which is compressed into a retainer 29 to form a pair of rings 27 and 28. The packing strips preferably have a "quarter round" cross section before being compressed into the retainer 29 and groove 13. The resilient fibrous rings or gaskets 27 and 28 are preferably made in accordance with the disclosures in U. S. Patents 2,376,039; 2,398,210 or 2,381,426 although is to be understood that any other packing material having similar characteristics and having resilient sealing properties at high temperatures may be used. The continuous annular abrasion strip or retainer 29 which separates the rings 27 and 28 within the groove 13, as best shown in Figure 2, permits contact of only a portion of the curved surfaces of the rings 27 and 28 with the curved surface of the groove 13. The retainer 29 is formed in the manner of a piston ring, and has a circumferential length approximately ⅛ inch less than the corresponding dimension of groove 13 to permit the retainer to be slipped into groove 13. The strips 27 and 28 are cut slightly overlength so that the ends will intermesh when the retainer 29 is slipped into the groove.

Before being compressed into the groove 13 by the external socket member 14 the cross section of the retainer ring 29 is substantially as shown in the enlarged view in Figure 6. It is formed of imperforate heat corrosion resistant sheet metal such as stainless steel or other suitable alloys and has a central folded section formed by connected legs 32 and 33 terminating at their upper ends in arms 34 and 35 having downturned end portions 36 and 37. When assembled into the completed ball and socket joint as best shown in Figure 2 it will be seen that the legs 32—33 separate the two fibrous packing rings 27 and 28, that the arms 34 and 35 prevent contact of the rings 27 and 28 with the external socket member 14, and that the downturned end portions 36 and 37 become turned in to compress the rings while bearing against the surface of the groove 13 which is substantially semi-circular in cross section. The outer surfaces of arms 34 and 35 as well as downturned end portions 36 and 37 are plated with hard chromium to reduce friction and prevent wear between them and the relatively movable parts engaged thereby. Thus the retainer strip 29 provides the greater portion of the engagement between the entire seal and the relatively movable parts of the joint, and the fold formed by connected legs 32 and 33 as well as the end portions 36 and 37 form barries to prevent the passage of the gases through the fibrous gasket between the ball and socket members of the joint. The sealing rings 27 and 28 are highly compressed by the retainer strip. The left hand joint 9 is provided with identical sealing means in the groove 21, including a retainer strip 38 and fibrous rings 39 and 40.

Referring to Figures 1 and 3, the cylindrical section 22 extends over section 15 a relatively short distance. However, a relatively thick collar 42, having heat radiating ribs 43 is welded to the external telescoping section 22 at 44 and has a substantial telescoping engagement with the tubular section 15. The inner diameters of collar 42 and section 22 are carefully determined and fitted with respect to the outer diameter of the inner cylindrical section 15 to provide a snug sliding fit at normal operating temperatures rather than a substantial freezing together as taught by the Patent 2,458,635 to Pitt and Sprenger.

Besides the elimination of abrading of the fibrous packing in the ball and socket members with the resultant wear in these members, the instant invention provides accommodation of lateral, angular, and axial displacements of required magnitude between the connected conduits even after the major expansions have occurred that are caused by the temperature changes between ambient and operating conditions. Even after hundreds of hours of operation at normal operating temperatures and pressures it has been found that the leakage of the entire joint was less than one pound of air per minute, that the gaskets continued to resiliently press the retainer strip against the socket members, and that there are no appreciable evidence of wear or deterioration.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flexible couple for conduits carrying high pressure and temperature fluid comprising: an internal conduit member; an external conduit member telescopingly receiving said internal member with a sliding fit; an annular groove of arcuate cross section circumscribing the telescoping surface of said internal member; an annular resilient metallic sealing element having a pair of integral annular depending marginal leg portions sealingly contacting opposite sides of said grove, curved surface portions sealingly contacting an annular area of the internal telescoping surface of the external member and an intermediate annular portion integrally interconnecting said curved surface portions and having an annular fold extending into said annular grove, whereby said metallic sealing element and said groove substantially define a pair of spaced annular chambers sealed by said depending leg portion from the telescoping sliding surfaces of said members; and resilient means disposed in each of said chambers resiliently biasing said leg portions into annular surface sealing contact with the sides of the groove in the internal member and the curved surface portion into annular surface sealing contact with the internal telescoping surface of the external member to form a fluid tight seal between the two members.

2. A flexible gas tight joint for a high temperature pressurized gas conduit comprising: sheet metal conduit sections formed and interfitted in relatively sliding spherical ball and socket engagement, means forming a continuous integral annular groove in the external surface of the ball section; a resilient annular metal sealing element between said ball and socket sections having an annular spherically curved surface in relative sliding sealing contact with the internal surface of said socket section and including integral inwardly projecting spaced annular marginal portions sealingly engaging opposite sides of said groove and defining with said groove a sealed annular chamber; and annular resilient packing means compressively disposed in and engaging the bottom of said groove and exerting an outward biasing force on said sealing element to maintain fluid tight area sealing contact between said curved surface and the socket member and between the projecting annular portions and said ball member.

3. The joint defined in claim 2 wherein said spring metal sealing element comprises a thin metal band having an intermediate portion of said curved surface bowed inwardly to provide a resilient hinge permitting said curved surface and projecting portions to be moved into sealing contact with said members under the biasing force of said resilient packing means.

4. The device as set forth in claim 1 wherein said resilient packing means comprises a pair of separate resilient annular rings separated by said bowed portion and each independently biasing a part of said curved surface and a respectively inwardly projecting portion into sealing contact with said members.

5. A fluid tight joint for conduits comprising a pair of conduit members having complementary annular surfaces telescoped in sliding engagement; a continuous annular depression formed in and circumscribing said surface of one of said members; a one piece resilient annular metallic sealing element disposed in said depression, having a pair of spaced annular end portions in continuous surface sealing contact at least with the annular surfaces of said depression immediately adjacent the telescoped annular surface of said one member containing said depression, and a pair of adjacent annular strips, each having an annular surface substantially parallel to said complementary surfaces, each of said annular strips being annularly integral with one of said spaced annular end portions and having their adjacent annular margins integrally connected to each other by an intermediate folded portion extending into said depression to thereby substantially define a pair of spaced annular chambers between the sealing element and the base of the depression; and resilient packing means within said chambers acting against the base of the depression and against the chamber surface of said sealing element to bias said pair of strips into surface sealing contact with said other member and to bias said spaced annular end portions into surface sealing contact with annular surfaces of said depression.

6. A fluid tight joint for conduits comprising a pair of conduit members, one member having an outer annular surface the other member having an inner annular surface complementary to said outer surface and said one member being telescoped in said other member with said complementary surfaces in sliding engagement; a continuous annular depression formed in and circumscribing said surface of said one member; a one piece resilient annular metallic sealing element disposed in said depression, having a pair of spaced depending annular portions in surface sealing contact at least with the annular surfaces of said depression adjacent the outer surface of said one member, and a pair of adjacent annular strips, each having an annular surface substantially parallel to said complementary surfaces, each of said annular strips being annularly integral with one of said spaced annular depending portions and connected at their adjacent marginal edges to each other by an intermediate annular portion containing a depending fold extending into said depression to thereby substantially define a pair of spaced annular chambers between the sealing element and the base of the depression; and resilient packing means within said chambers acting against the base of the depression and against the inner surface of said sealing element to bias said pair of annular strips into surface sealing contact with said inner annular surface of said other member and to bias said spaced depending annular portions into surface sealing contact with annular surfaces of said depression.

7. A flexible seal for a spherical ball and socket conduit connection which has an annular groove provided in one of the ball and socket members for retaining the seal comprising: a metallic sealing ring of resilient sheet metal having an annular central imperforate band with a curved annular sealing surface defined as the surface generated by a circular arc whose radius is equal to the radius of the sealing ring and which arc is rotated about the axis of the circular sealing ring, a substantially radially disposed annular imperforate band integral with and extending from each annular axial margin of said central band to provide a channel shaped cross-section of the sealing ring with the curved annular sealing surface on the exterior of the channel integrally joined with annular substantially radially directed sealing surfaces on the sides of the substantially radially disposed bands, said central annular band being provided intermediate of the substantially radially directed bands with a deep integral annular imperforate fold extending between said substantially radially directed bands, functioning as a spring hinge and forming separate annular recesses on the side of the sealing ring opposite its sealing surfaces; and independent resilient means disposed in each annular recess to provide a biasing force that will urge the sealing portions of said sealing ring into sealing engagement upon assembly in a ball and socket conduit connection.

8. A flexible seal as defined in claim 7, wherein said independent resilient means in each recess comprises, in assembly, a continuous annulus contiguous with the surfaces of corresponding recesses.

References Cited in the file of this patent

UNITED STATES PATENTS

| Number | Name | Date |
|---|---|---|
| 867,752 | Phillips | Oct. 8, 1907 |
| 961,872 | Lutz | June 21, 1910 |
| 1,514,192 | Bausman | Nov. 4, 1924 |
| 2,376,017 | Smallpeice | May 15, 1945 |
| 2,381,426 | Allen et al. | Aug. 7, 1945 |
| 2,470,546 | Carlson | May 17, 1949 |
| 2,484,693 | De Witt et al. | Oct. 11, 1949 |
| 2,458,635 | Pitt et al. | Jan. 11, 1949 |
| 2,502,753 | Rohr | Apr. 4, 1950 |

FOREIGN PATENTS

| Number | Country | Date |
|---|---|---|
| 275,097 | Great Britain | Aug. 4, 1927 |